(12) United States Patent
Osborne et al.

(10) Patent No.: US 11,959,508 B2
(45) Date of Patent: Apr. 16, 2024

(54) LOCKING PANEL ASSEMBLY

(71) Applicant: The Boeing Company, Chicago, IL (US)

(72) Inventors: John C. Osborne, Bothell, WA (US); Steven A. Scott, Newcastle, WA (US)

(73) Assignee: The Boeing Company, Arlington, VA (US)

( * ) Notice: Subject to any disclaimer, the term of this patent is extended or adjusted under 35 U.S.C. 154(b) by 763 days.

(21) Appl. No.: 16/897,139

(22) Filed: Jun. 9, 2020

(65) Prior Publication Data
US 2021/0381535 A1 Dec. 9, 2021

(51) Int. Cl.
*F16B 5/06* (2006.01)
*B64C 1/18* (2006.01)
*E04F 15/02* (2006.01)

(52) U.S. Cl.
CPC .............. *F16B 5/0607* (2013.01); *B64C 1/18* (2013.01); *E04F 15/02044* (2013.01); *F16B 2005/0678* (2013.01)

(58) Field of Classification Search
CPC .............. Y10T 403/7045; Y10T 403/70; Y10T 403/7064; Y10T 403/7066; F16B 3/80; F16B 5/0012; F16B 5/06; F16B 5/067; F16B 2005/0678; F16B 2/14; B64C 1/18; B64C 1/20
See application file for complete search history.

(56) References Cited

U.S. PATENT DOCUMENTS

| 5,489,172 | A | * | 2/1996 | Michler | B64D 11/0696 410/104 |
|---|---|---|---|---|---|
| 9,126,670 | B2 | | 9/2015 | Thable et al. | |
| 9,545,990 | B2 | * | 1/2017 | Stegmiller | B64C 1/20 |
| 9,738,402 | B2 | * | 8/2017 | Brown | B64C 1/20 |

(Continued)

FOREIGN PATENT DOCUMENTS

| DE | 102019114147 A1 | 12/2020 | |
| WO | WO-2009000003 A1 * | 12/2008 | ........... E04B 1/6137 |

OTHER PUBLICATIONS

European Patent Office, Extended European Search Report Issued in Application No. 21159727.3, dated Aug. 2, 2021, Germany, 10 pages.

(Continued)

*Primary Examiner* — Amber R Anderson
*Assistant Examiner* — Zachary A Hall
(74) *Attorney, Agent, or Firm* — Alleman Hall & Tuttle LLP

(57) ABSTRACT

A panel assembly for installation onto a track beam including a beam flange having a non-linear edge is disclosed. The panel assembly includes a panel and a lockable catch moveably connected to the panel. The lockable catch includes a lockable mating edge configured to selectively mate with the non-linear edge of the beam flange of the track beam. The lockable catch also includes a lockable catch edge extending beyond the lockable mating edge. The lockable catch is moveable on a lower surface of the panel between an unlocked position and a locked position. In the unlocked position the lockable catch edge is retracted. In the locked position, the lockable mating edge mates with the non-linear edge of the beam flange and the lockable catch edge retains the panel on the track beam.

20 Claims, 9 Drawing Sheets

(56) References Cited

U.S. PATENT DOCUMENTS

| | | | |
|---|---|---|---|
| 10,800,509 B2 * | 10/2020 | Mills | B64C 1/18 |
| 11,542,013 B2 * | 1/2023 | Benthien | B60N 2/08 |
| 11,548,645 B2 * | 1/2023 | Oleson | B60N 2/14 |
| 2018/0327074 A1 | 11/2018 | Mills et al. | |
| 2018/0327075 A1 | 11/2018 | Mills et al. | |

OTHER PUBLICATIONS

Canadian Intellectual Property Office, Office Action Issued in Application No. 3,111,195, Feb. 9, 2024, 4 pages.

* cited by examiner

LOCKING PANEL ASSEMBLY

FIELD

The disclosure relates generally to a panel assembly, and more specifically to a panel assembly including a lockable catch configured to retain a panel on a track beam.

BACKGROUND

In many applications, panels may be affixed to structural frames using many fasteners, such as rivets, bolts, nails, or screws. Installing and removing such panels can be a laborious and time-consuming effort due to the large number of fasteners.

SUMMARY

A panel assembly for installation onto a track beam including a beam flange having a non-linear edge is disclosed. The panel assembly includes a panel and a lockable catch moveably connected to the panel. The lockable catch includes a lockable mating edge configured to selectively mate with the non-linear edge of the beam flange of the track beam. The lockable catch also includes a lockable catch edge extending beyond the lockable mating edge. The lockable catch is moveable on a lower surface of the panel between an unlocked position and a locked position. In the unlocked position the lockable catch edge is retracted. In the locked position, the lockable mating edge mates with the non-linear edge of the beam flange and the lockable catch edge retains the panel on the track beam.

The features and functions that have been discussed can be achieved independently in various embodiments or may be combined in yet other embodiments further details of which can be seen with reference to the following description and drawings.

DETAILED DESCRIPTION

Conventional panels are mechanically fastened to corresponding structural frames using a large number of fasteners (e.g., rivets, bolts, nails, or screws) in order to suitably transfer shear and/or other loads from the panels to the corresponding structural frames. Installing and removing such panels can be a laborious and time-consuming effort due to the large number of fasteners employed to retain the panels on the structural frames.

The present description is directed to a panel assembly that uses a reduced number of fasteners for installation on a corresponding structural frame relative to conventional panels. Instead of only relying on fasteners, the panel assembly is designed to use moveable panel locks to selectively retain the panels on the structural frames. As described in more detail below, such a panel assembly can greatly reduce or even completely eliminate the number of fasteners used to fasten a panel to a structural frame, as compared to the conventional approach. As such, the time required for installation and/or removal of the panel can be greatly reduced. Furthermore, the overall weight of the assembly can be decreased due to the reduced number of fasteners. Such a panel assembly may be particularly advantageous when used as the floor panel assembly in an aircraft. However, the panel assemblies described herein are not limited to aircraft floor panel assemblies and may be used for any panel application.

Figure 1:
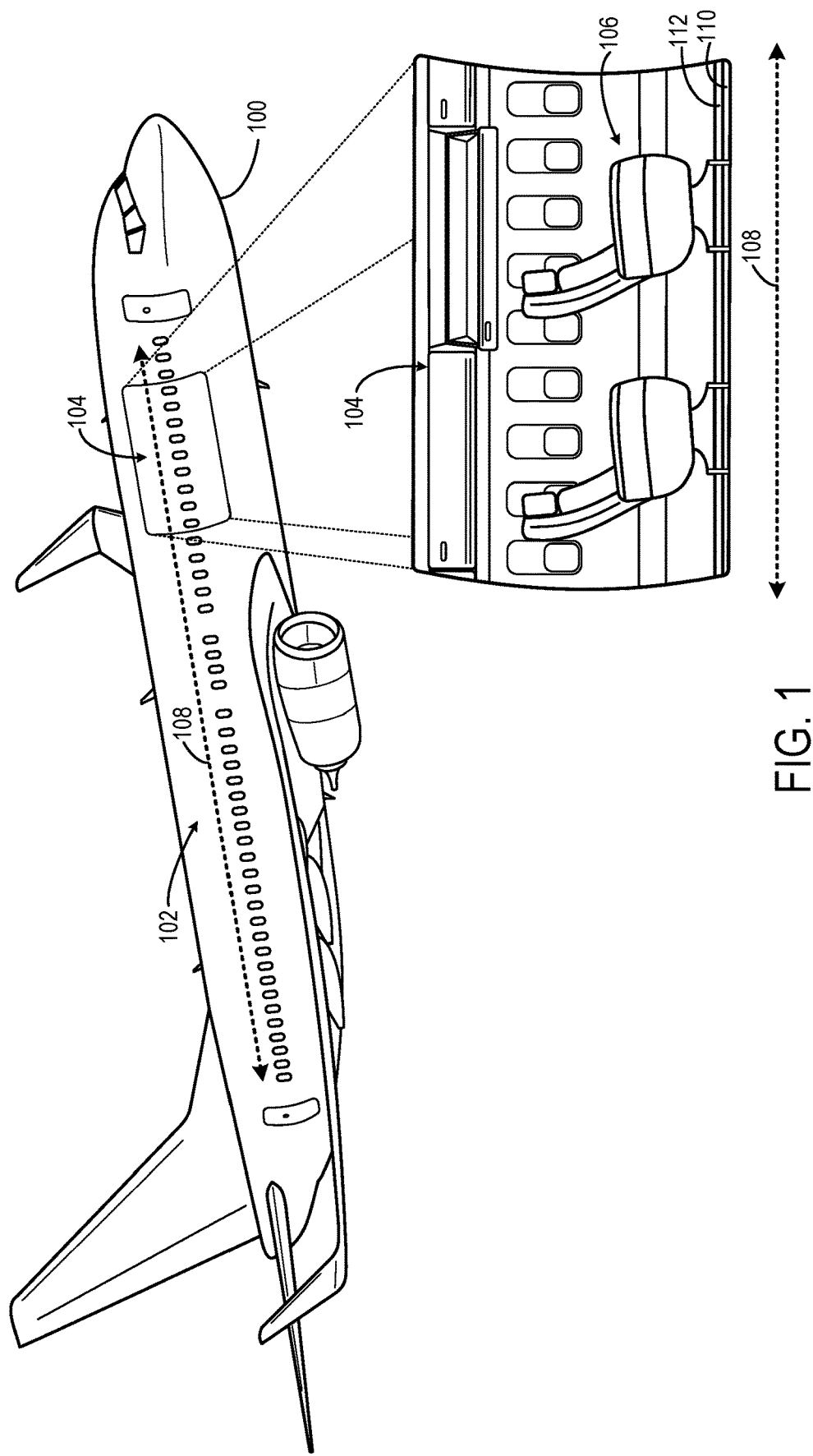
FIG. 1 shows an example embodiment of an aircraft in which an aircraft floor panel assembly is installed onto an aircraft seat track beam.
Figure 2:
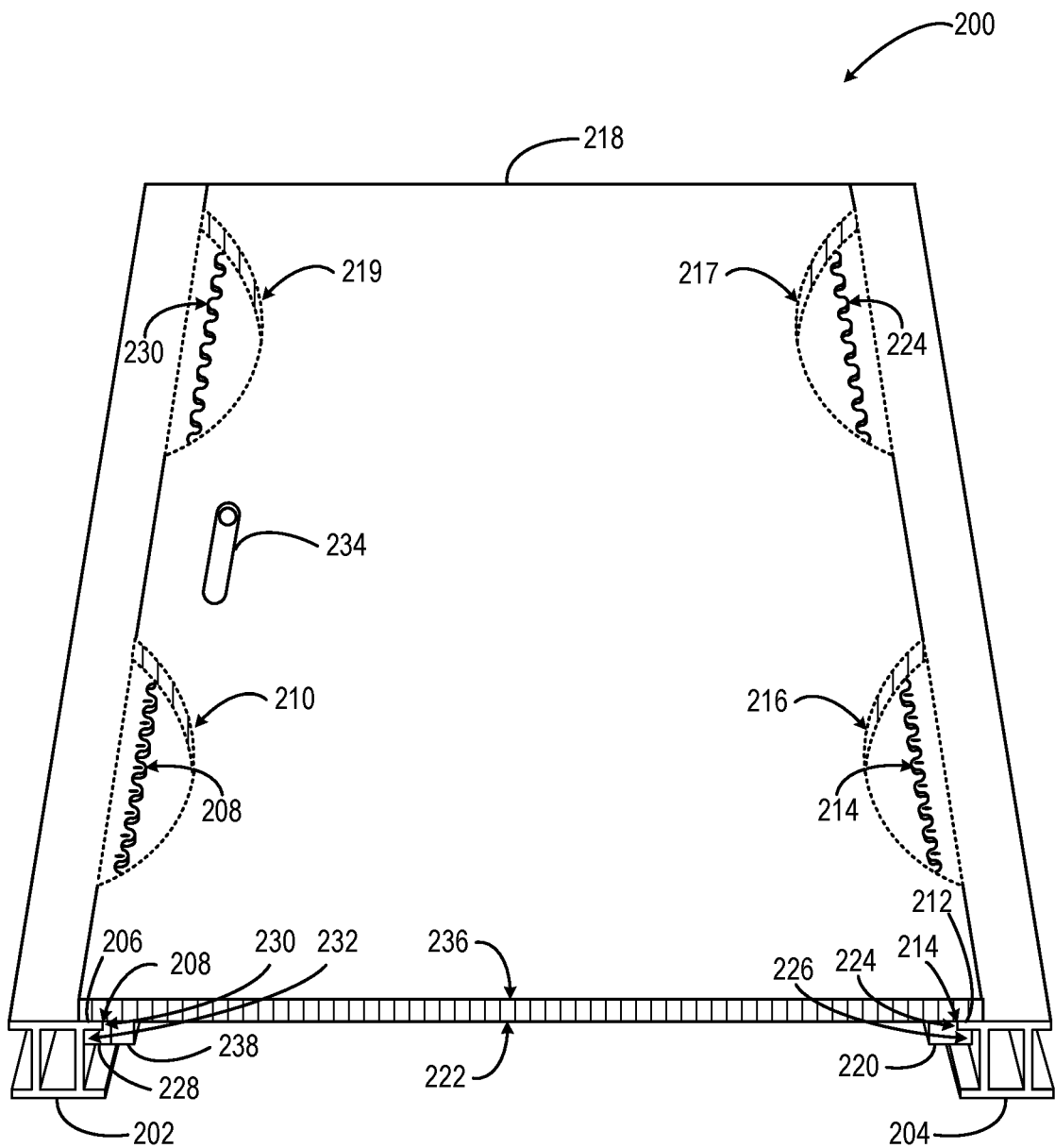
FIG. 2 shows an example embodiment of an aircraft floor panel assembly installed onto an aircraft seat track beam.

FIG. 1 shows an illustrative aircraft 100 including a fuselage 102. The fuselage 102 includes an interior cabin section 104, illustrated with increased detail in the call out. The interior cabin section 104 includes a plurality of passenger seats 106 arranged in rows oriented perpendicular to a longitudinal axis 108 of the fuselage 102. Each row of passenger seats 106 is mechanically fastened to two or more aircraft seat track beams 110, which are typically oriented coaxially with the longitudinal axis 108 of the fuselage 102. The aircraft seat track beams 110 provide a structural frame that anchors the passenger seats 106 to the fuselage 102. An aircraft floor panel assembly 112 is installed on top of a pair of aircraft seat track beams 110. The aircraft floor panel assembly 112 provides a structural floor to support passengers, luggage, and other equipment within the interior cabin section 104. The aircraft floor panel assembly 112 is configured to be quickly and easily installed on the aircraft seat track beams 110 using a moveable lockable catch 228 (shown in FIG. 2) that enables the aircraft floor panel assembly 112 to be installed on the aircraft seat track beams 110 using a reduced number of fasteners relative to a conventional floor panel assembly.

FIGS. 2-8 show an illustrative aircraft floor panel assembly 200 for installation onto spaced apart aircraft seat track beams—e.g., aircraft seat track beam 202, and aircraft seat track beam 204. The aircraft seat track beam 202 includes a beam flange 206 having a non-linear edge 208 (i.e., not straight in the longitudinal direction of the beam). The illustrative shape of the non-linear edge 208 is shown in cutout 210. The aircraft seat track beam 204 includes a beam flange 212 spaced apart from the beam flange 206. The beam flange 212 has a non-linear edge 214. The illustrative shape of the non-linear edge 214 is shown in cutout 216. The aircraft seat track beam 202 and/or the aircraft seat track beam 204 may be made of any suitable material including, but not limited to metal (e.g., aluminum, titanium, steel) and composite material (e.g. carbon fiber).

For ease of explanation, features associated with the aircraft seat track beam 202 may be characterized as being "first" and features associated with the aircraft seat track beam 204 may be characterized as being "second," in some instances. For example, the aircraft seat track beam 202 may be referred to as a first aircraft seat track beam and the aircraft seat track beam 204 may be referred to as a second aircraft seat track beam. Further, the beam flange 206 may be referred to as a first beam flange and the beam flange 212 may be referred to as a second beam flange. Further still, the non-linear edge 208 may be referred to as a first non-linear edge and the non-linear edge 214 may be referred to as a second non-linear edge.

The aircraft floor panel assembly 200 includes an aircraft floor panel 218 configured to be installed on top of the aircraft seat track beams 202, 204. The aircraft floor panel 218 may have any suitable dimensions to span any suitable distance between the aircraft seat track beams 202, 204. The aircraft floor panel 218 may include any suitable material including, but not limited to, metal, wood, carbon fiber, or another composite material.

The aircraft floor panel assembly 200 includes a fixed catch 220 fixedly connected to a lower surface 222 of the aircraft floor panel 218. The fixed catch 220 includes a fixed mating edge 224 and a fixed catch edge 226. The fixed mating edge 224 is configured to selectively mate with the non-linear edge 214 of the beam flange 212 of the aircraft seat track beam 204. In particular, the fixed mating edge 224 is non-linearly shaped to match the non-linear edge 214 of the beam flange 212. The illustrative shape of the fixed mating edge 224 is shown in cutout 217. Note that the non-linear edge of the beam flange 212 is not shown in the cutout 217 in order to show the non-linear shape of the fixed mating edge 224. In some embodiments, the fixed catch edge 226 may have a non-linear shape. For example, the fixed catch edge 226 may have a similar shape as the fixed mating edge 224. In other embodiments, the fixed catch edge 226 may have a linear shape (e.g., a straight edge) that is dissimilar to the fixed mating edge 224. The fixed catch edge 226 extends beyond the fixed mating edge 224. As such, when the aircraft floor panel assembly 200 is installed on the aircraft seat track beams 202, 204, the fixed mating edge 224 interleaves with the non-linear edge 214 of the beam flange 212; and the fixed catch edge 226 extends underneath the beam flange 212 to retain the aircraft floor panel 218 on the aircraft seat track beam 204.

The aircraft floor panel assembly 200 includes a lockable catch 228 moveably connected to the lower surface 222 of the aircraft floor panel 218. The lockable catch 228 is moveable on the lower surface 222 of the aircraft floor panel 218 between an unlocked position and a locked position. The lockable catch 228 may be movably connected to the lower surface 222 of the aircraft floor panel 218 in any suitable manner. In one example, the lockable catch 228 includes a frame portion and a moveable portion connected to the frame portion. The frame portion may be fastened (e.g., via screws, adhesive) to the lower surface 222 of the aircraft floor panel 218 in a fixed position and the moveable portion may be movably connected to the frame portion, such that the moveable portion is able to translate laterally relative to the beam flange 206 of the aircraft seat track beam 202. In another example, the lockable catch 228 may be movably connected to the lower surface 222 of the aircraft floor panel via one or more floating inserts that are installed within the aircraft floor panel 218. The floating inserts may allow the lockable catch 228 to translate laterally relative to the beam flange 206 of the aircraft seat track beam 202 while being retained in the floating inserts.

The lockable catch 228 includes a lockable mating edge 230 and a lockable catch edge 232. The lockable mating edge 230 is configured to selectively mate with the non-linear edge 208 of the beam flange 206 of the aircraft seat track beam 202. In particular, the lockable mating edge 230 is non-linearly shaped to match the non-linear edge 208. The illustrative shape of the lockable mating edge 230 is shown in cutout 219. Note that the non-linear edge of the beam flange 206 is not shown in the cutout 219 in order to show the non-linear shape of the lockable mating edge 230. In some embodiments, the lockable catch edge 232 may have a non-linear shape. For example, the lockable catch edge 232 may have a similar shape as the lockable mating edge 230. In other embodiments, the lockable catch edge 232 may have a linear shape (e.g., a straight edge) that is dissimilar to the lockable mating edge 230. The lockable catch edge 232 extends beyond the lockable mating edge 230.

In the unlocked position, the lockable catch edge 232 is retracted sufficiently away from the beam flange 206 and toward the fixed catch edge 226 for the aircraft floor panel 218 to be seated on the aircraft seat track beams 202, 204. In particular, in the unlocked position, the lockable catch edge 232 is retracted sufficiently to clear the non-linear edge 208 such that the lockable catch edge 232 can be lowered past the beam flange 206 of the aircraft seat track beam 202. Furthermore, the lockable catch edge 232 is spaced far enough apart from the beam flange 206 of the aircraft seat track beam 202 to allow the fixed catch edge 226 to clear the non-linear edge 214 such that the fixed catch edge 226 can be lowered past the beam flange 212 of the aircraft seat track beam 204.

Once the fixed catch edge 226 is lowered beyond the beam flange 212 of the aircraft seat track beam 204, the aircraft floor panel 218 can be translated laterally toward the aircraft seat track beam 204. After this translation, the fixed mating edge 224 mates with the non-linear edge 214 of the beam flange 212 of the aircraft seat track beam 204 and the fixed catch edge 226 extends underneath the beam flange 212. In this way, the aircraft floor panel 218 is seated on the aircraft seat track beams 202, 204 and the lockable catch 228 is ready to be moved to the locked position.

During locking, the lockable mating edge 230 translates laterally toward the non-linear edge 208 of the beam flange 206 of the aircraft seat track beam 202. In the locked position, the lockable mating edge 230 mates with the non-linear edge 208 of the beam flange 206 of the aircraft seat track beam 202, and the lockable catch edge 232 extends underneath the beam flange 206 of the aircraft seat track beam 202. Likewise, when the lockable catch 228 is in the locked position, the fixed mating edge 224 remains mated with the non-linear edge 214 of the beam flange 212 of the aircraft seat track beam 204, and the fixed catch edge 226 extends underneath the beam flange 212 of the aircraft seat track beam 204. In this way, the lockable catch edge 232 and the fixed catch edge 226 cooperatively retain the aircraft floor panel 218 on the aircraft seat track beams 202, 204, for example by resisting separation of the aircraft floor panel 218 from the aircraft seat track beams 202, 204.

Note that the interleaving of the lockable mating edge 230 with the matched non-linear edge 208 of the beam flange 206 of the aircraft seat track beam 202 may enable shear and/or other loads to be transferred from the aircraft floor panel 218 to the aircraft seat track beam 202 with a reduced number of fasteners relative to a conventional floor panel assembly. Likewise, the interleaving of the fixed mating edge 224 with the matched non-linear edge 214 of the beam flange 212 of the aircraft seat track beam 204 may enable shear and/or other loads to be transferred from the aircraft floor panel 218 to the aircraft seat track beam 204 with a reduced number of fasteners relative to a conventional floor panel assembly.

The aircraft floor panel assembly 200 comprises a key 234 configured to transition the lockable catch 228 between the unlocked position and the locked position. The key 234 is accessible from above an upper surface 236 of the aircraft floor panel 218 for manipulation by an operator to transition the lockable catch 228 between the unlocked position and the locked position, such as during installation or removal of the aircraft floor panel 218. Additionally or alternatively, the key 234 may be accessible from the lower surface 222 of the aircraft floor panel 218.

The key 234 is configured to hold the lockable catch 228 in the locked position until the key 234 is manipulated to transition the lockable catch 228 from the locked position to the unlocked position and vice versa. In particular, the key 234 extends through the aircraft floor panel 218 and mechanically couples to the lockable catch 228. The key 234 includes a translation mechanism 238 that is mechanically coupled to the lockable catch 228. The translation mechanism 238 is configured to translate movement of the key 234 into movement of the lockable catch 228 between the unlocked position to the locked position. The translation mechanism 238 of the key 234 may take any suitable form. One nonlimiting example of the translation mechanism is described with reference to FIGS. 3-8.

Figure 3:
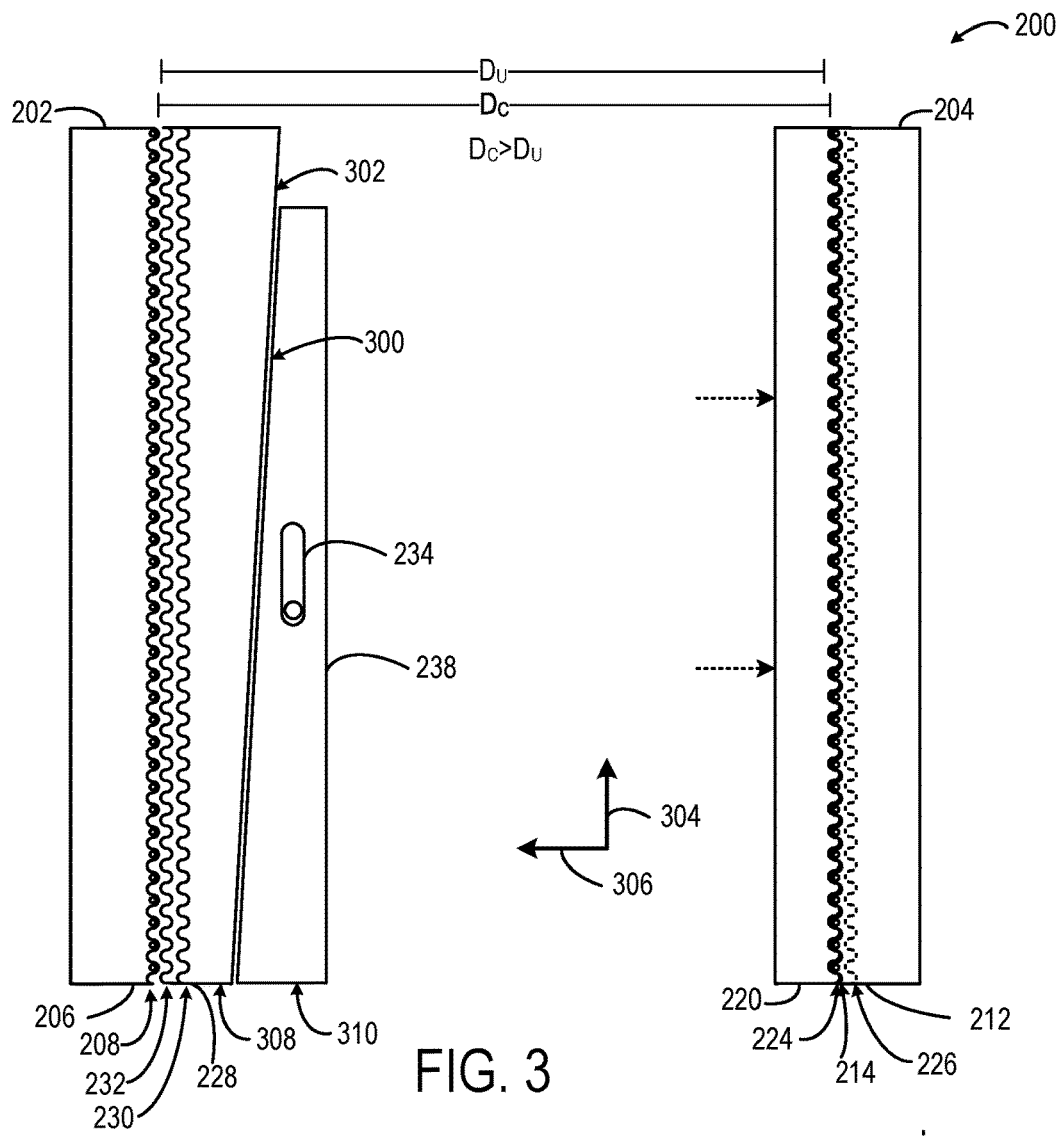
FIGS. 3-4 show an example embodiment of an aircraft floor panel assembly in an unlocked position.
Figure 4:
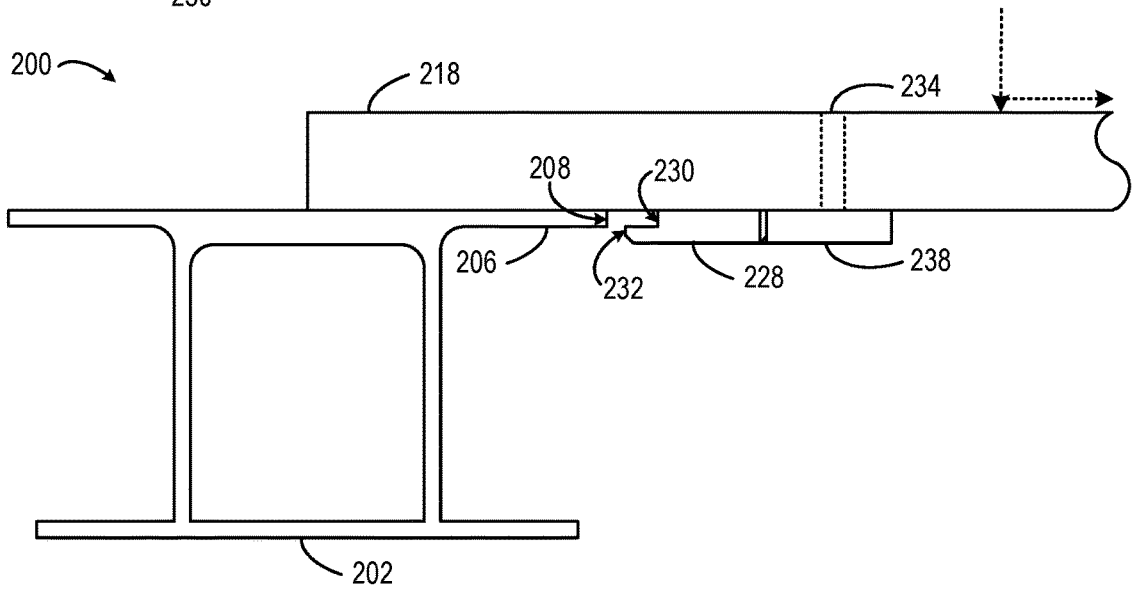

FIGS. 3-8 show the illustrative aircraft floor panel assembly 200 transitioning from the unlocked position to the locked position. The aircraft floor panel assembly 200 includes the translation mechanism 238 in the form of a wedge configured to transition the lockable catch 228 between the locked position and the unlocked position. FIG. 3 shows an overhead view of the illustrative aircraft floor panel assembly 200 with the aircraft floor panel 218 not shown in order to expose the lockable catch 228 in an unlocked position. FIG. 4 is a cross-sectional view of the aircraft floor panel assembly 200 showing the aircraft floor panel 218 and the lockable catch 228 in the unlocked position.

As noted above with reference to FIG. 2, and as further illustrated in FIG. 3, the non-linear edge 208, 214 of the beam flanges 206, 212 are shaped with a non-linear, scalloped or sinusoidal pattern that match the fixed and lockable mating edges 224, 230. Such interleaving of the matched non-linear edges of the beam flanges and the catches enable shear and/or other loads to be transferred from the aircraft floor panel 218 to the aircraft seat track beams 202, 204 with a reduced number of fasteners relative to a conventional floor panel assembly. In other embodiments, the non-linear edges of the beam flanges of the aircraft seat track beams may be shaped with other non-linear patterns. In still other embodiments, the non-linear edges of the beam flanges of the aircraft seat track beams may be shaped with non-repeating, arbitrary non-linear edges that enable shear and/or other loads to be transferred from the aircraft floor panel to the aircraft seat track beams with a reduced number of fasteners relative to a conventional floor panel assembly. In the illustrated embodiment, the edge of the beam flange that opposes the beam flange 206 has a linear shape (e.g., a straight edge) that is dissimilar to the non-linear edge 208 of the beam flange 206. Likewise, the edge of the beam flange that opposes the beam flange 212 has a linear shape (e.g., a straight edge) that is dissimilar to the non-linear edge 214 of the beam flange 212. The edges of these opposing beam flanges are illustrated as being linear for ease of explanation. In other embodiments, the edges of these opposing beam flanges may have non-linear edges that have the same shape as non-linear edges 208, 214, such that additional aircraft floor panels may be fastened to the seat track beams 202, 204 on each side of the aircraft floor panel 218 in the same manner that the aircraft floor panel assembly 200 is fastened to the seat track beams 202, 204. In still other embodiments, these beam flanges may have edges that are shaped differently than the non-linear edges 208, 214.

As shown in FIG. 3, the fixed catch 220 mates with the aircraft seat track beam 204. Note that when the aircraft floor panel 218 is initially placed on top of the aircraft seat track beams 202, 204 (indicated by the downward pointing dashed arrow shown in FIG. 4) with the lockable catch 228 in the unlocked position, an unlocked distance ($D_U$) between the lockable catch edge 232 and the fixed catch edge 226 is less than a clearance distance ($D_C$) between the non-linear edge 208 of the beam flange 206 of the aircraft seat track beam 202 and the non-linear edge 214 of the beam flange 212 of the aircraft seat track beam 204. In the unlocked position, the lockable catch edge 232 and the fixed catch edge 226 are spaced to allow the aircraft floor panel 218 to be seated on the aircraft seat track beams 202, 204. In particular, as shown in FIG. 4, in the unlocked position, the lockable catch edge 232 is retracted sufficiently to not interfere with the beam flange 206 of the aircraft seat track beam 202, such that the aircraft floor panel 218 can be seated on the aircraft seat track beams 202, 204. Once the aircraft floor panel 218 is seated on the aircraft seat track beams 202, 204, the aircraft floor panel assembly 200 is translated laterally toward the second aircraft seat track beam 204 (indicated by the left-pointing dashed arrows in FIGS. 3 and 4), such that the fixed mating edge 224 mates with the non-linear edge 214 of the beam flange 212 and the fixed catch edge 226 extends beneath the non-linear edge 214 of the beam flange 212 of the aircraft seat track beam 204 as shown in FIG. 3.

The aircraft floor panel assembly 200 includes the key 234 mechanically coupled to the lockable catch 228. The key 234 includes a wedge 238 having an angled side 300 that interfaces with an opposing angled side 302 of the lockable catch 228. Manipulation of the key 234, for example by sliding the key 234 in a first direction 304 (e.g., aligned with the longitudinal axis 108 of the fuselage 102 of the aircraft 100 shown in FIG. 1), causes the wedge 238 to also move in the first direction 304. The wedge 238 is configured to move in the first direction 304 thereby causing the lockable catch 228 to move in a second direction 306 perpendicular to the first direction 304 to transition the lockable catch 228 from the unlocked position to the locked position. In particular, as the wedge 238 moves in the first direction 304 a wider portion of the wedge 238 interacts with a wider portion of the lockable catch 228 causing the lockable catch 228 to move in the second direction 306 towards the aircraft seat track beam 202. The angled side 300 of the wedge 238 provides even pressure across a majority of the corresponding angled side 302 of the lockable catch 228 to move the lockable catch toward the aircraft seat track beam 202. Note that in the illustrated embodiment, when the lockable catch 228 is in the unlocked position, a side 308 of the lockable catch 228 is substantially aligned with a side 310 of the wedge 238.

Figure 5:
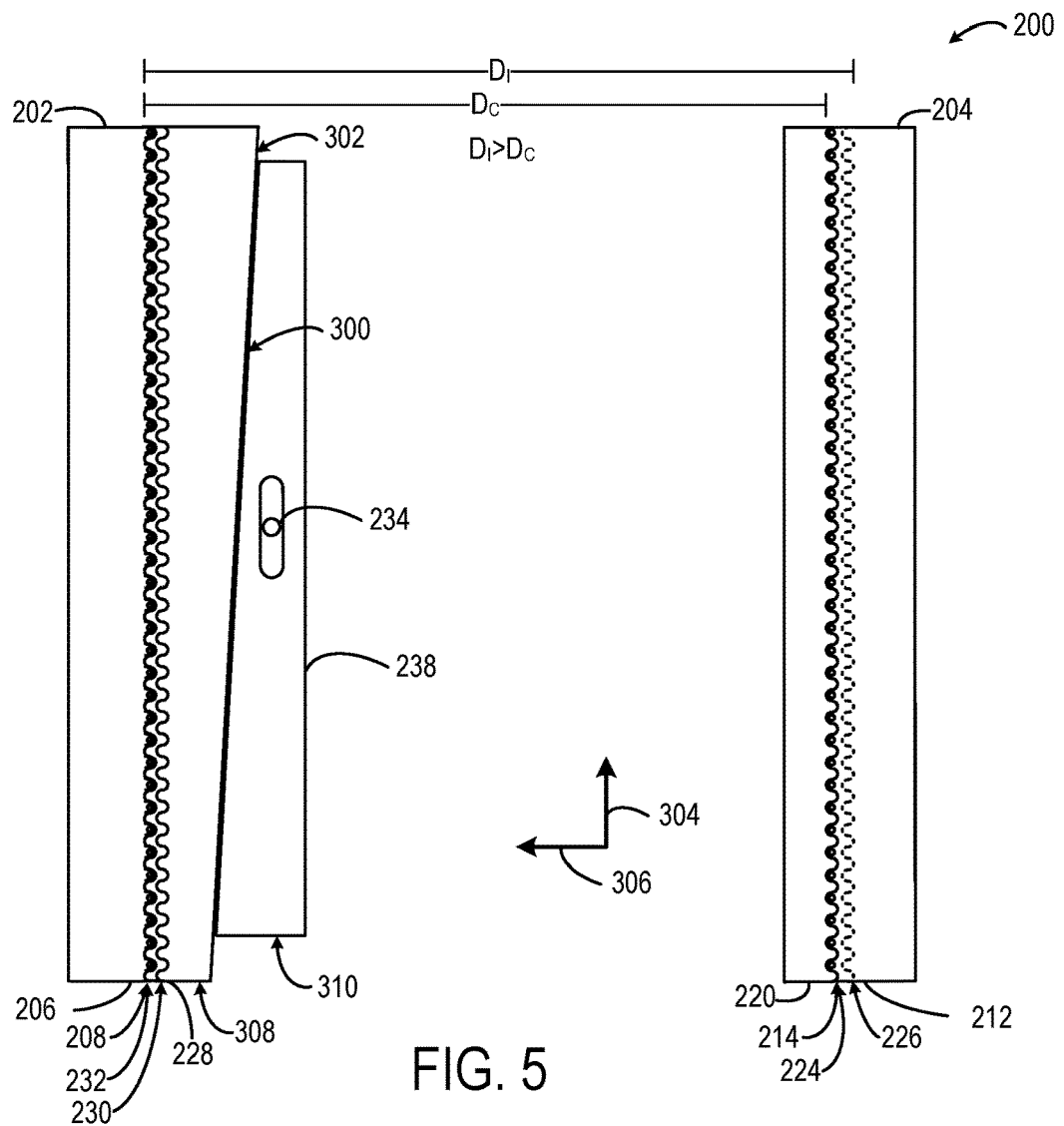
FIGS. 5-6 show the aircraft floor panel assembly of FIGS. 3-4 transitioning from the unlocked position to a locked position.
Figure 6:
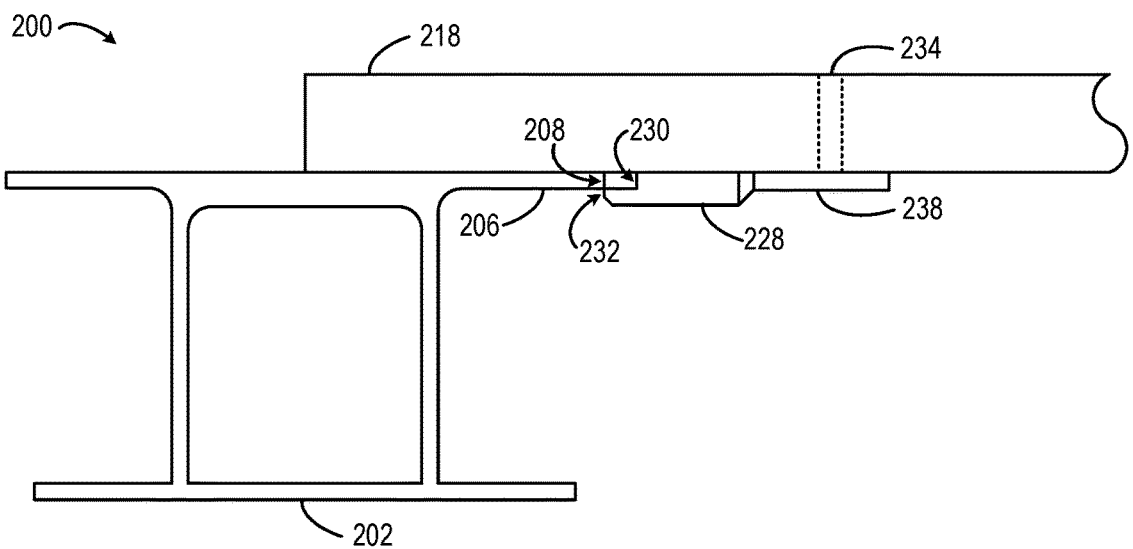

FIGS. 5-6 show the aircraft floor panel assembly 200 with the lockable catch 228 transitioning from the unlocked position to the locked position. As shown in FIG. 5, the fixed catch 220 mates with the aircraft seat track beam 204 such that the fixed mating edge 224 interleaves with the non-linear edge 214; and the fixed catch edge 226 extends underneath the beam flange 212 of the aircraft seat track beam 204. Furthermore, the key 234 and correspondingly the wedge 238 has moved in the first direction 304 causing the lockable catch 228 to move in the second direction 306 toward the aircraft seat track beam 202. When the lockable catch 228 is in this position, an intermediate distance ($D_I$) between the lockable catch edge 232 and the fixed catch edge 226 is greater than the clearance distance ($D_C$) between the non-linear edge 208 of the beam flange 206 of the aircraft seat track beam 202 and the non-linear edge 214 of the beam flange 212 of the aircraft seat track beam 204. As shown in FIG. 4, in this position, the lockable catch edge 232 is vertically aligned with the non-linear edge 208 of the beam flange 206 of the aircraft seat track beam 202. Also, note that the wedge 238 has traveled in the first direction 304, such that the side 308 of the lockable catch 228 is no longer aligned with the side 310 of the wedge 238.

Figure 7:
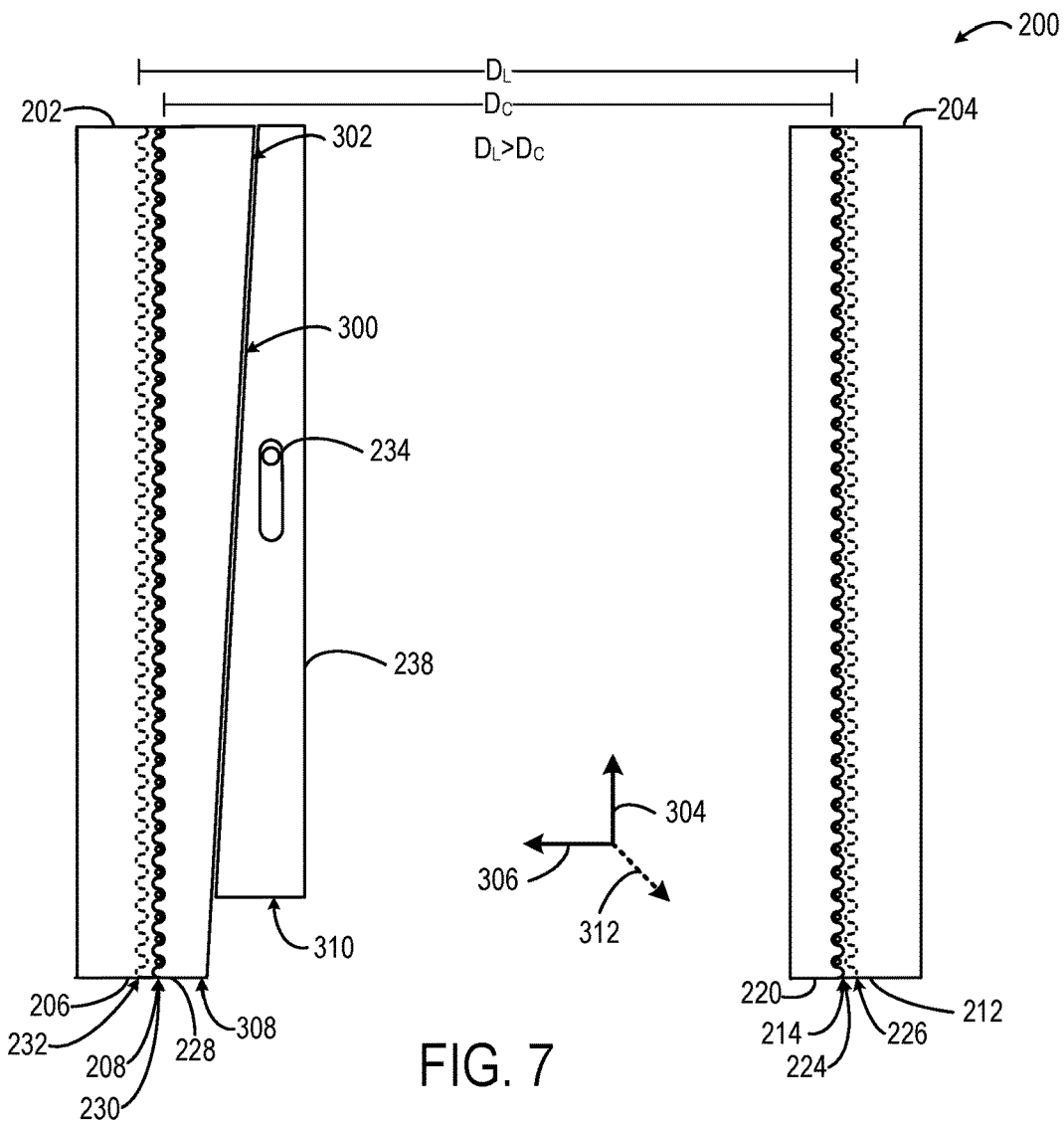
FIGS. 7-8 show the aircraft floor panel assembly of FIGS. 3-4 in the locked position.
Figure 8:
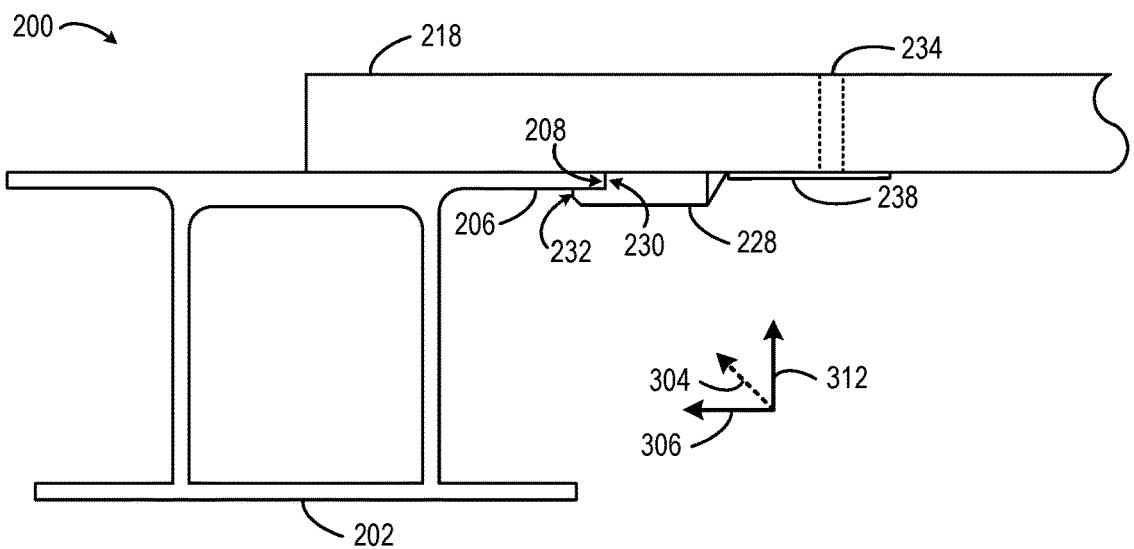

FIGS. 7-8 show the aircraft floor panel assembly 200 with the lockable catch 228 in the locked position. As shown in FIG. 7, the key 234 has been further manipulated in the first direction 304. Correspondingly, the wedge 238 has moved in the first direction 304 causing the lockable catch 228 to move in the second direction 306 toward the aircraft seat track beam 202 to transition the lockable catch 228 into the locked position. When the lockable catch 228 is in the locked position, a locked distance ($D_L$) between the lockable catch edge 232 and the fixed catch edge 226 is the greater than the clearance distance ($D_C$) between the non-linear edge 208 of the beam flange 206 of the aircraft seat track beam 202 and the non-linear edge 214 of the beam flange 212 of the aircraft seat track beam 204. As shown in FIG. 8, in the locked position, the lockable mating edge 230 mates with the non-linear edge 208 of the beam flange 206 of the aircraft seat track beam 202, and the lockable catch edge 232 extends underneath the non-linear edge 208 of the beam flange 206. Further, the fixed catch edge 226 remains underneath the non-linear edge 214 of the beam flange 212 of the aircraft seat track beam 204. As such, the lockable catch edge 232 and the fixed catch edge 226 cooperatively retain the aircraft floor panel 218 on the aircraft seat track beams 202, 204 to resist separation of the aircraft floor panel 218 from the aircraft seat track beams 202, 204 in a third direction 312. Furthermore, the mating/interleaving of the lockable mating edge 230 with the non-linear edge 208 and the fixed mating edge 224 with the non-linear edge 214 collectively holds the aircraft floor panel 218 to resist movement of the aircraft floor panel 218 in the first direction 304. In both instances, such retention/holding is accomplished with a reduced number of fasteners relative to a conventional floor panel assembly.

In the illustrated embodiment, the wedge is provided as a non-limiting example of a translation mechanism that is configured to translate manipulation of the key into movement of the lockable catch between the unlocked position and the locked position. In other embodiments, other types of translation mechanisms may be employed. As one alternative example, the translation mechanism may include a scissor type translation mechanism that is configured to extend and retract based on manipulation of the key. In such an example, the key may include a rotary knob that may be rotated clockwise/counterclockwise to extend/retract the lockable catch. In some keyless embodiments, the lockable catch may be moved by a motor, which may be electronically controlled.

In some embodiments, the aircraft floor panel may include a lockable catch on each side of the panel instead of one lockable catch and one fixed catch.

Figure 9:
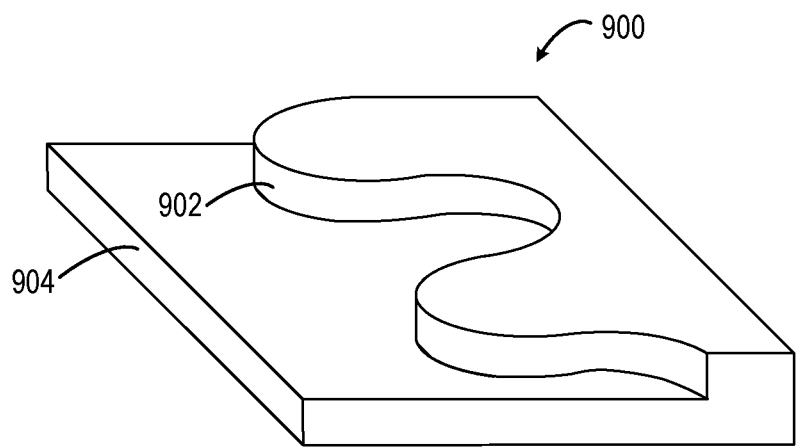
FIG. 9 shows an example embodiment of a lockable catch of an aircraft floor panel assembly having a lockable mating edge shaped with a scalloped pattern.

In different embodiments, the aircraft seat track beams may include beam flanges having non-linear edges having different shapes. Correspondingly, the lockable catch and the fixed catch of the aircraft floor panel assembly may include corresponding mating edges that complement the shapes of the non-linear edges of the beam flanges such that the lockable and fixed catches are configured to mate with the beam flanges. FIGS. 9-12 show different example embodiments of a lockable catch having different shaped edges. FIG. 9 shows a lockable catch 900 including a lockable mating edge 902 shaped with a scallop pattern that is complementary with a scallop pattern of a corresponding edge of a beam flange (not shown) with which the lockable catch is configured to selectively mate. The lockable catch 900 further includes a lockable catch edge 904 extending beyond the lockable mating edge 902 and having a linear or straight shape that is configured to extend underneath the beam flange when the lockable mating edge 1102 mates with the non-linear edge of the beam flange. Note that in such an embodiment the lockable catch may be capable of enough lateral translation (i.e., toward the fixed catch) to allow for the lockable catch and the fixed catch to clear the non-linear edges of the beam flanges of the aircraft seat track beams, such that the aircraft floor panel can be seated on top of the aircraft seat track beams.

Figure 10:
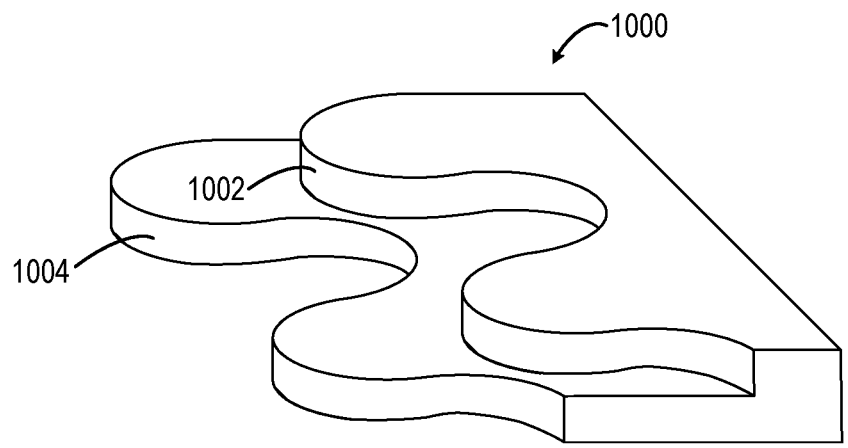
FIG. 10 shows an example embodiment of a lockable catch of an aircraft floor panel assembly having a lockable mating edge and a lockable catch edge shaped with a scalloped pattern.

FIG. 10 shows a lockable catch 1000 including a lockable mating edge 1002 shaped with a scallop pattern that is complementary with a scallop pattern of a corresponding edge of a beam flange (not shown) with which the lockable catch is configured to selectively mate. The lockable catch 1000 further includes a lockable catch edge 1004 extending beyond the lockable mating edge 1002 and shaped with a scalloped pattern similar to the scallop pattern of the lockable mating edge 1002. The lockable catch edge 1004 is configured to extend underneath the beam flange when the lockable mating edge 1102 mates with the non-linear edge of the beam flange.

Figure 11:
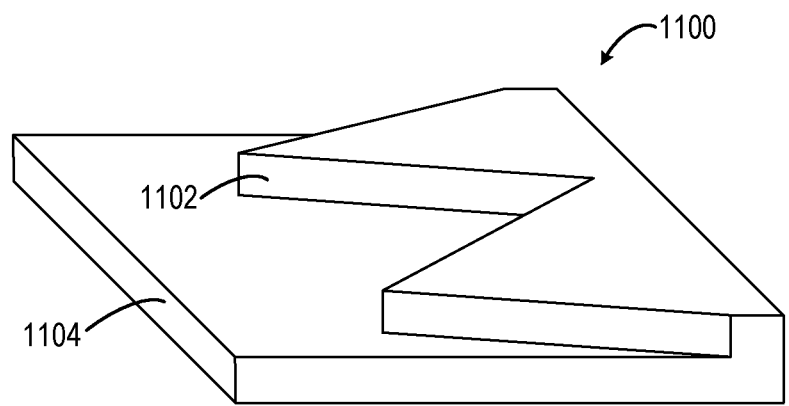
FIG. 11 shows an example embodiment of a lockable catch of an aircraft floor panel assembly having a lockable mating edge shaped with a sawtooth pattern.

FIG. 11 shows a lockable catch 1100 including a lockable mating edge 1102 shaped with a sawtooth pattern that is complementary with a sawtooth pattern of a corresponding edge of a beam flange (not shown) with which the lockable catch is configured to selectively mate. The lockable catch 1100 further includes a lockable catch edge 1104 extending beyond the lockable mating edge 1102 and having a linear or straight shape that is configured to extend underneath the beam flange when the lockable mating edge 1102 mates with the non-linear edge of the beam flange. Note that in such an embodiment the lockable catch may be capable of enough lateral translation (i.e., toward the fixed catch) to allow for the lockable catch and the fixed catch to clear the non-linear edges of the beam flanges of the aircraft seat track beams, such that the aircraft floor panel can be seated on top of the aircraft seat track beams.

Figure 12:
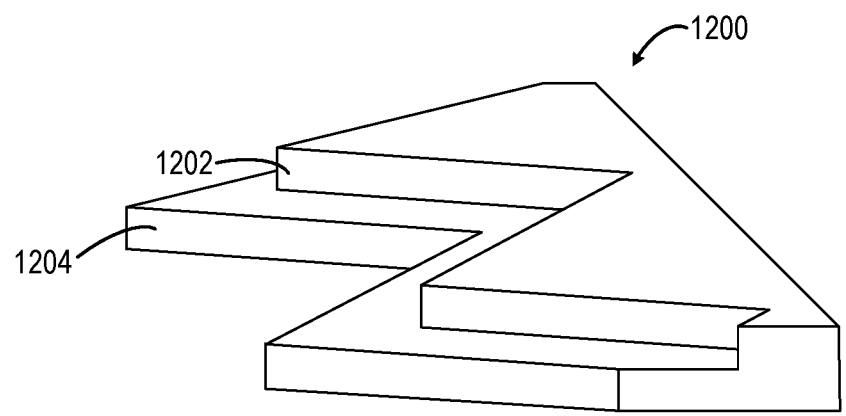
FIG. 12 shows an example embodiment of a lockable catch of an aircraft floor panel assembly having a lockable mating edge and a lockable catch edge shaped with a sawtooth pattern.

FIG. 12 shows a lockable catch 1200 including a lockable mating edge 1202 shaped with a sawtooth pattern that is complementary with a sawtooth pattern of a corresponding edge of a beam flange (not shown) with which the lockable catch is configured to selectively mate. The lockable catch 1200 further includes a lockable catch edge 1204 extending beyond the lockable mating edge 1202 and shaped with a sawtooth pattern similar to the sawtooth pattern of the lockable mating edge 1002. The lockable catch edge 1204 is configured to extend underneath the beam flange when the lockable mating edge 1202 mates with the non-linear edge of the beam flange.

It will be appreciated that the non-linear edges of the beam flanges may have any suitable non-linear shape that facilitates interlocked mating with corresponding non-linear edges of the lockable and fixed catches in order to transfer shear and/or other loads from the aircraft floor panel to the aircraft seat track beams. In some but not all embodiments, the non-linear shaped edges may be patterned and/or periodic.

Figure 13:
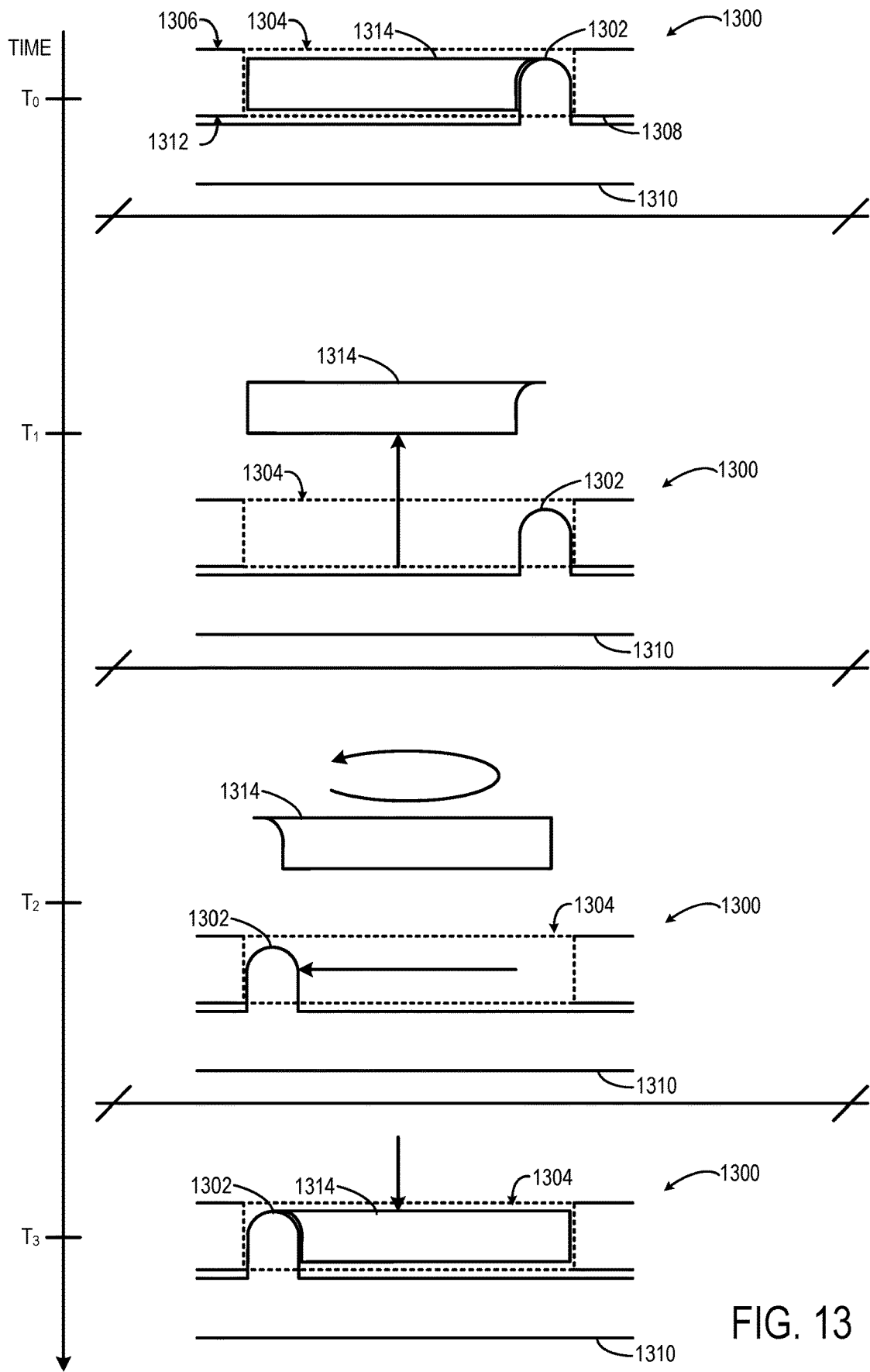
FIG. 13 shows an example embodiment of a key configured to transition an aircraft floor panel assembly between an unlocked position and a locked position.
Figure 14:
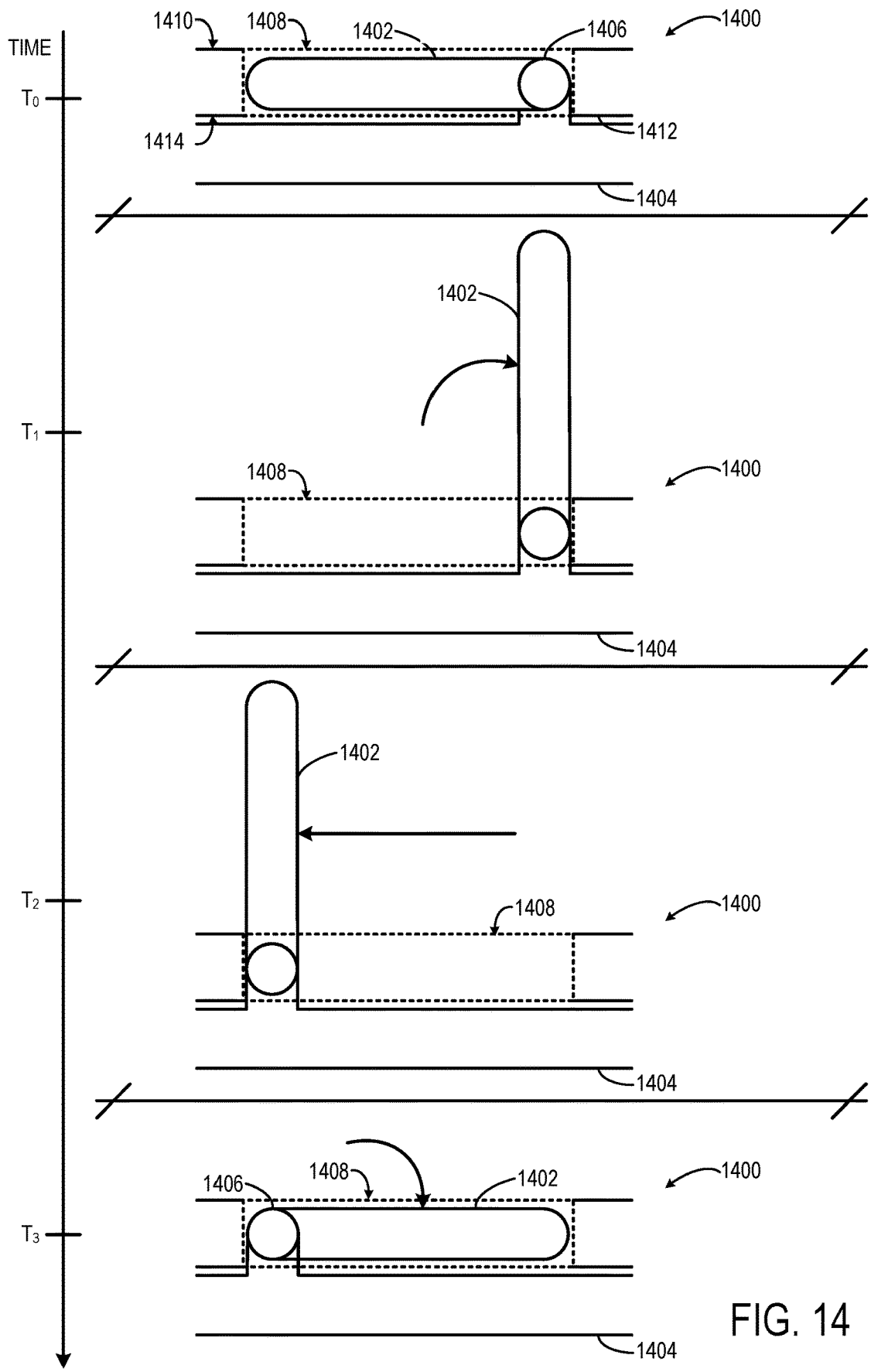
FIG. 14 shows another example embodiment of a key configured to transition an aircraft floor panel assembly between an unlocked position and a locked position.

In different embodiments, the aircraft floor panel assembly may include differently configured keys that may be manipulated in different manners to move the lockable catch between the unlocked position and the locked position. FIGS. 13-14 show different examples embodiments of keys configured to transition the lockable catch from the unlocked position to the locked position.

FIG. 13 shows an illustrative key 1300 including a sliding handle 1302. The sliding handle 1302 fits into a pocket 1304 formed in an upper surface 1306 of an aircraft floor panel 1308. The sliding handle 1302 extends through the aircraft floor panel 1308 to couple to a wedge 1310 positioned underneath a lower surface 1312 of the aircraft floor panel 1308. At time $T_0$, the sliding handle 1302 is positioned in the pocket 1304 in a first orientation when a lockable catch (not shown) that interfaces with the wedge 1310 is in an unlocked position. The sliding handle 1302 is maintained in the first orientation in the pocket 1304 by a removable retainer 1314. The removable retainer 1314 is configured to occupy the empty space in the pocket 1304 to prevent the sliding handle 1302 from inadvertently sliding in the pocket 1304 and hold the lockable catch in the unlocked position until the key 1300 is manipulated to transition the lockable catch from the unlocked position to the locked position. At time $T_1$, the removable retainer 1314 is removed from the pocket 1304 to allow the sliding handle 1302 to slide within the pocket 1304. At time $T_2$, the sliding handle 1302 is slid in the pocket 1304 from the first orientation to a second orientation on the other side of the pocket 1304 thereby moving the wedge 1310 and causing the lockable catch to mate with the aircraft seat track beam (not shown) in the locked position. Additionally, the removeable retainer 1314 is rotated to align with the sliding handle 1302 in the second orientation in the pocket 1304. At time $T_3$, the removable retainer 1314 is replaced in the pocket 1304 to maintain the sliding handle 1302 in the second orientation and thereby maintain the lockable catch in the locked position. The removable retainer may be retained in the pocket in any suitable manner. In some embodiments, the removable retainer may include a fastener or lock configured to retain the removable retainer in the pocket. In other embodiments, the removable retainer may be maintained in the pocket via a tension fit. Note that the key action shown in FIG. 13 may be performed in the reverse order to transition the lockable catch from the locked position to the unlocked position.

FIG. 14 shows an illustrative key 1400 including a lever 1402. The lever 1402 is pivotably coupled to a wedge 1404 via a hinge 1406. The lever 1402 is configured to pivot 180 degrees about the hinge 1406. At time $T_0$, the lever 1402 is pivoted to fit into a pocket 1408 formed in an upper surface 1410 of an aircraft floor panel 1412. The lever 1402 and hinge 1406 collectively extend through the aircraft floor panel 1412 to couple to the wedge 1404 positioned underneath a lower surface 1414 of the aircraft floor panel 1412. At time $T_0$, the lever 1402 is pivoted about the hinge 1416 such that the lever 1402 is positioned in the pocket 1408 in a first orientation when a lockable catch (not shown) that interfaces with the wedge 1404 is in an unlocked position. The lever 1402 is oriented in the first orientation to occupy the empty space in the pocket 1408 to hold the lockable catch in the unlocked position until the key 1400 is manipulated to transition the lockable catch from the unlocked position to the locked position. At time $T_1$, the lever 1402 is pivoted clockwise about the hinge 1406 such that the lever 1402 extends out of the pocket 1408 perpendicular to the aircraft floor panel 1412. The lever 1402 is oriented in this manner to allow the lever 1402 to be manipulated to transition the lockable catch from the unlocked position to the locked position. At time $T_2$, the lever 1402 is slid to the other side of the pocket 1408 thereby moving the wedge 1404 and causing the lockable catch to mate with the aircraft seat track beam (not shown) in the locked position. At time $T_3$, the lever 1402 is pivoted clockwise about the hinge 1406 such that the lever 1402 fits in the pocket 1408 in a second orientation opposite the first orientation to occupy the empty space in the pocket 1408. In this way, the lever 1402 holds the wedge 1404 and the lockable catch in the locked position until the key 1400 is manipulated to transition the lockable catch from the locked position to the unlocked position. The lever may be configured to keep this orientation in the pocket until being further manipulated. For example, the lever may be held in place with a fastener, cam, tension, or a retention device. Note that the lever action shown in FIG. 14 may be performed in the reverse order to transition the lockable catch from the locked position to the unlocked position.

The illustrated embodiments are provided as non-limiting examples of a key. In other embodiments, other types of keys may be employed. As one alternative example, the key may include a rotary knob that may be rotated clockwise/counterclockwise to extend/retract the lockable catch. Furthermore, the key may be retained in the aircraft floor panel in any suitable manner. In some embodiments, the key may be coupled to the aircraft floor panel via a floating insert. In other embodiments, the key may be coupled to the aircraft floor panel with a mechanical fastener and/or an adhesive. In some keyless embodiments, the lockable catch may be moved by a motor, which may be electronically controlled.

Although the panel assembly is illustrated as operating without using any fasteners, the panel assembly can be combined with some fasteners in some embodiments. For example, in some embodiments, fasteners may be used to hold the lockable catch in place when locked.

Although the panel assembly is discussed in the context of a floor panel for an aircraft, it will be appreciated that the various features and techniques disclosed herein are broadly applicable to installing a panel on a structural frame having any suitable orientation (e.g., on a floor, wall, or ceiling). Furthermore, the various features and techniques disclosed herein are broadly applicable to installing a panel on a structural frame in any suitable vehicle (e.g., aircraft, marine craft, automobile), building (e.g., residential building, commercial building, industrial building), or other structure (e.g., shipping container, box).

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. An aircraft floor panel assembly for installation onto an aircraft seat track beam including a beam flange having a non-linear edge, the aircraft floor panel assembly comprising:
   an aircraft floor panel having an upper surface and a lower surface that opposes the upper surface; and
   a lockable catch moveably connected to the aircraft floor panel and in contact with the lower surface of the aircraft floor panel, the lockable catch including a lockable mating edge configured to selectively mate with the non-linear edge of the beam flange, and a lockable catch edge extending beyond the lockable mating edge;
   wherein the lockable catch is moveable on the lower surface of the aircraft floor panel between an unlocked position and a locked position;
   wherein the lockable catch edge translates toward the non-linear edge of the beam flange based on the lockable catch moving from the unlocked position to the locked position;
   wherein when the lockable catch is in the unlocked position, the lockable catch edge is retracted away from the non-linear edge of the beam flange sufficiently for the aircraft floor panel to be seated on the aircraft seat track beam; and
   wherein when the lockable catch is in the locked position, the lockable mating edge mates with the non-linear edge of the beam flange and the lockable catch edge retains the aircraft floor panel on the aircraft seat track beam with the upper surface and the lower surface in a horizontal orientation.

2. A panel assembly for installation onto a first track beam including a first beam flange having a first non-linear edge, the panel assembly comprising:
   a panel having an upper surface and a lower surface that opposes the upper surface; and
   a lockable catch moveably connected to the panel and in contact with the lower surface of the panel, the lockable catch including a lockable mating edge configured to selectively mate with the first non-linear edge of the first beam flange of the first track beam, and a lockable catch edge extending beyond the lockable mating edge;
   wherein the lockable catch is moveable on the lower surface of the panel between an unlocked position and a locked position;
   wherein the lockable catch edge translates toward the first non-linear edge of the first beam flange based on the lockable catch moving from the unlocked position to the locke d position;
   wherein when the lockable catch is in the unlocked position, the lockable catch edge is retracted away from the first non-linear edge of the first beam flange sufficiently for the panel to be seated on the first track beam; and
   wherein when the lockable catch is in the locked position, the lockable mating edge mates with the first non-linear edge of the first beam flange and the lockable catch edge retains the panel on the first track beam with the upper surface and the lower surface in a horizontal orientation; and
   a key configured to transition the lockable catch from the unlocked position to the locked position.

3. The panel assembly of claim 2, wherein the key is accessible from above the upper surface of the panel.

4. The panel assembly of claim 2, wherein the key is configured to hold the lockable catch in the locked position until the key is manipulated to transition the lockable catch from the locked position to the unlocked position.

5. The panel assembly of claim 2, further comprising a fixed catch including a fixed mating edge configured to selectively mate with a second non-linear edge of a second beam flange of a second track beam spaced apart from the first track beam, and a fixed catch edge extending beyond the fixed mating edge.

6. The panel assembly of claim 5, wherein when the lockable catch is in the unlocked position, an unlocked distance between the lockable catch edge and the fixed catch edge is less than a clearance distance between the first non-linear edge of the first beam flange of the first track beam and the second non-linear edge of the second beam flange of the second track beam; and
   wherein, when the lockable catch is in the locked position, a locked distance between the lockable catch edge and the fixed catch edge is greater than the clearance distance between the first non-linear edge of the first beam flange of the first track beam and the second non-linear edge of the second beam flange of the second track beam.

7. The panel assembly of claim 2, wherein the first non-linear edge of the first beam flange is shaped with a scalloped pattern, and wherein the lockable mating edge is shaped with a complementary scalloped pattern.

8. The panel assembly of claim 2, wherein the first non-linear edge of the first beam flange is shaped with a sawtooth pattern, and wherein the lockable mating edge is shaped with a complementary sawtooth pattern.

9. The panel assembly of claim 2, wherein the key includes a wedge.

10. The panel assembly of claim 9, wherein the wedge is configured to move in a first direction thereby causing the lockable catch to move in a second direction perpendicular to the first direction to transition the lockable catch from the unlocked position to the locked position.

11. The panel assembly of claim 10, wherein the key includes a handle affixed to the wedge and configured to slide in the first direction thereby causing the wedge to move in the first direction and the lockable catch to move in the second direction to transition the lockable catch from the unlocked position to the locked position.

12. The panel assembly of claim 11, wherein the panel includes a pocket, wherein the handle includes a lever pivotably coupled to the wedge, wherein the handle fits into the pocket in a first orientation when the lockable catch is in the locked position, and wherein the handle fits into the pocket in a second orientation, opposite the first orientation, when the lockable catch is in the unlocked position.

13. An aircraft floor panel assembly for installation onto spaced apart first and second aircraft seat track beams respectively including spaced apart first and second beam flanges respectively having spaced apart first and second non-linear edges, the aircraft floor panel assembly comprising:
   an aircraft floor panel having an upper surface and a lower surface that opposes the upper surface;
   a lockable catch moveably connected to the aircraft floor panel and in contact with the lower surface of the aircraft floor panel, the lockable catch including a lockable mating edge configured to selectively mate with the first non-linear edge of the first beam flange of the first aircraft seat track beam, and a lockable catch edge extending beyond the lockable mating edge;

a fixed catch fixedly connected to the aircraft floor panel and including a fixed mating edge configured to selectively mate with the second non-linear edge of the second beam flange of the second aircraft seat track beam, and a fixed catch edge extending beyond the fixed mating edge;

wherein the lockable catch is moveable on the lower surface of the aircraft floor panel between an unlocked position and a locked position;

wherein the lockable catch edge translates toward the first non-linear edge of the first beam flange based on the lockable catch moving from the unlocked position to the locked position;

wherein when the lockable catch is in the unlocked position, the lockable catch edge is retracted away from the first non-linear edge of the first beam flange sufficiently toward the fixed catch edge for the aircraft floor panel to be seated on the first and second aircraft seat track beams; and wherein when the lockable catch is in the locked position, the lockable mating edge mates with the first non-linear edge of the first beam flange, the fixed mating edge mates with the second non-linear edge of the second beam flange, and the lockable catch edge and the fixed catch edge cooperatively retain the aircraft floor panel on the first aircraft seat track beam with the upper surface and the lower surface in a horizontal orientation.

14. The aircraft floor panel assembly of claim 13, further comprising a key configured to transition the lockable catch from the unlocked position to the locked position.

15. The aircraft floor panel assembly of claim 14, wherein the key is accessible from above the upper surface of the aircraft floor panel.

16. The aircraft floor panel assembly of claim 14, wherein the key is configured to hold the lockable catch in the locked position until the key is manipulated to transition the lockable catch from the locked position to the unlocked position.

17. The aircraft floor panel assembly of claim 14, wherein the key includes a wedge.

18. The aircraft floor panel assembly of claim 13, wherein when the lockable catch is in the unlocked position, an unlocked distance between the lockable catch edge and the fixed catch edge is less than a clearance distance between the first non-linear edge of the first beam flange of the first aircraft seat track beam and the second non-linear edge of the second beam flange of the second aircraft seat track beam; and wherein, when the lockable catch is in the locked position, a locked distance between the lockable catch edge and the fixed catch edge is greater than the clearance distance between the first non-linear edge of the first beam flange of the first aircraft seat track beam and the second non-linear edge of the second beam flange of the second aircraft seat track beam.

19. The aircraft floor panel assembly of claim 13, wherein the first and second non-linear edges of the spaced apart first and second beam flanges are shaped with a scalloped pattern, and wherein the lockable mating edge and the fixed mating edge are shaped with a complementary scalloped pattern.

20. The aircraft floor panel assembly of claim 13, wherein the first and second non-linear edges of the spaced apart first and second beam flanges are shaped with sawtooth patterns, and wherein the lockable mating edge and the fixed mating edge are shaped with complementary sawtooth patterns.

* * * * *